Oct. 18, 1932.  C. A. SWART ET AL  1,883,085
ROLLER BEARING CONSTRUCTION
Filed April 12, 1930
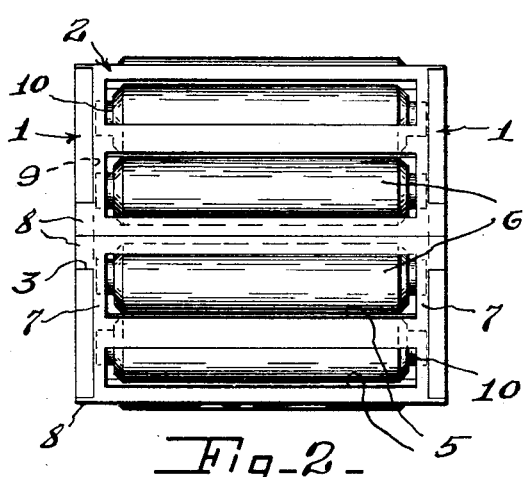
Fig-2-
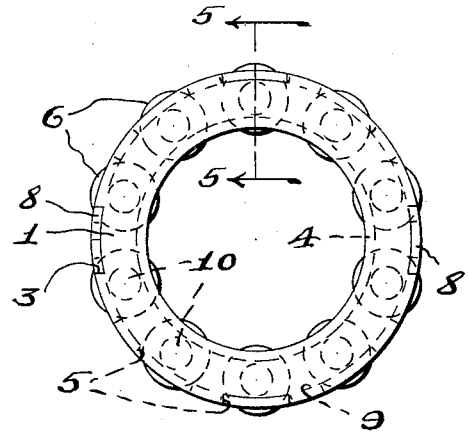
Fig-1-
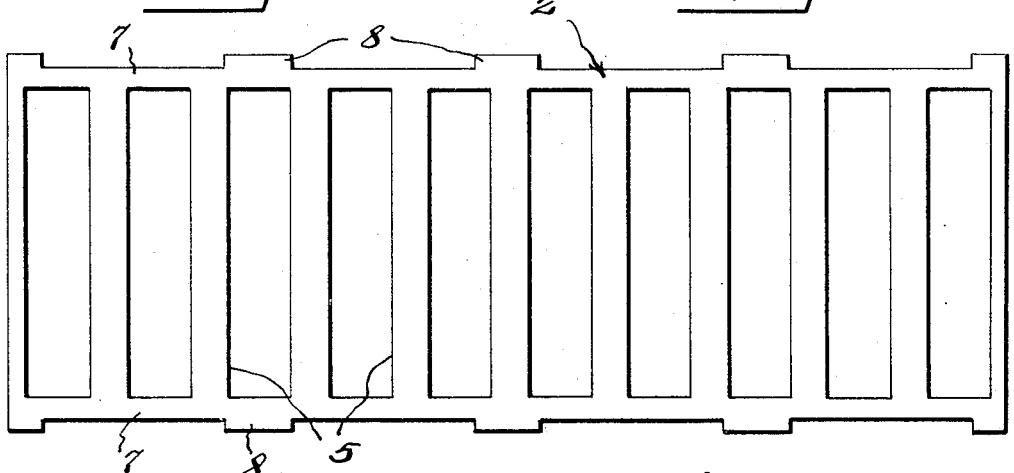
Fig-3-
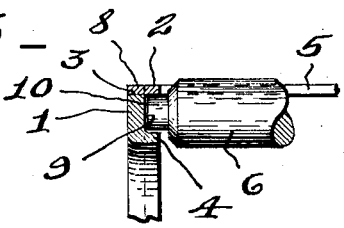
Fig-5-
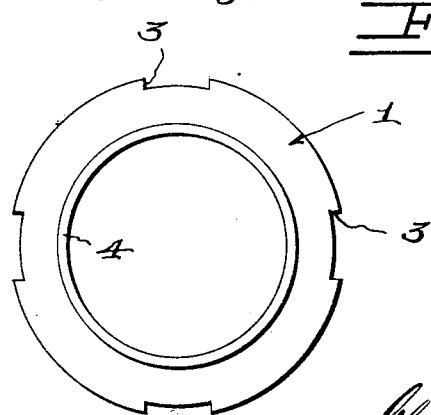
Fig-4-
INVENTORS.
Clarence A. Swart and John H. Evans
BY
Bodell & Thompson
ATTORNEYS.

Patented Oct. 18, 1932

1,883,085

UNITED STATES PATENT OFFICE

CLARENCE A. SWART AND JOHN H. EVANS, OF SYRACUSE, NEW YORK, ASSIGNORS TO ROLLWAY BEARING COMPANY, INC., OF SYRACUSE, NEW YORK, A CORPORATION OF NEW YORK

ROLLER BEARING CONSTRUCTION

Application filed April 12, 1930. Serial No. 443,860.

This invention relates to roller bearings and has for its object a roller bearing or cage construction therefor, which is particularly simple, economical in construction on a production basis and highly efficient in use.

The invention consists in the novel features and in the combinations and constructions hereinafter set forth and claimed.

In describing this invention, reference is had to the accompanying drawing in which like characters designate corresponding parts in all the views.

Figures 1 and 2 are, respectively, end and side elevations of the roller bearing.

Figure 3 is a plan view of the blank of the cylinder wall.

Figure 4 is an inner face view of one of the heads.

Figure 5 is a fragmentary sectional view on line 5—5, Figure 1.

The cage of the bearing comprises heads 1 and a cylindrical wall 2, the cage being formed with raceways for receiving axles at the ends of the rollers and the cylindrical wall with slots terminating short of the heads and through which the rollers project, the strips between the slots forming spacers for the rollers and the rollers having reduced axles in the raceways.

The invention lies in the formation and assembly of the heads and cylindrical wall.

Preferably, both heads are alike in construction and secured in the same way to the cylindrical wall.

Each head 1 is an annular plate formed up of sheet metal. It is formed with rectangular spaced notches 3 in its peripheral edge and with an annular inwardly extending flange 4 at its inner edge.

The cylindrical wall 3 is formed from a sheet metal blank rolled into cylindrical form.

5 designate the slots in the wall 2. 6 are the roller spacing strips between the slots, and 7 the marginal side strips of the wall 3 left after the slots 5 are formed. The marginal strips 7 are formed with tongues 8 complemental to the notches 3 and secured therein, preferably by spot welding. The marginal strips, the edges of which abut against the heads together with the flanges 4 and interposed portions of the heads provide raceways 9 for the reduced ends or axles 10 of the rollers 6.

The rollers 6 are of sufficient diameter to project beyond the periphery of the cage and inwardly beyond inner circles of the heads in order to roll on the inner surface of a bearing or raceway and on the periphery of a shaft or other rotating part journalled in the bearing.

Preferably, the outer faces of the tongues 8, the spacing strips 5 and side margins of the cylindrical wall are flush with the peripheries of the heads.

Owing to the construction and assembly of the heads and the cylindrical wall, the bearing is extremely simple and economical to manufacture in quantities and is highly efficient and durable in use.

What we claim is:

1. A roller bearing comprising a cage consisting of opposing annular heads, each having spaced apart notches in its peripheral edge and an inturned annular flange at its inner edge and a cylindrical wall between the heads, said wall having transverse spaced apart slots terminating short of the side edges of said wall, the side margins of said wall having spaced apart tongues seating and secured in the notches, the tongues projecting from the end of the cylindrical wall and flush therewith and the periphery of the cylindrical wall being flush with the edges of the heads in which the notches are formed, the portions of the side margins between the notches abutting against the heads between the notches and together with said flanges and the portions of the heads between the flanges and the tongues forming raceways and rollers projecting through and extending into said slots and having axles at their ends in the raceways.

2. A roller bearing comprising a cage consisting of opposing heads and a cylindrical wall between the heads, the wall having slots terminating short of the heads, the heads and the cylindrical wall forming raceways, rollers projecting through the slots and having axles at their ends in the raceways, one of the heads consisting of an annular plate having spaced apart notches in its peripheral edge and an inturned flange at its inner edge and the cylindrical wall having tongues secured in the notches, the tongues projecting from the end of the cylindrical wall and flush therewith and the periphery of the cylindrical wall being flush with the edges of the heads in which the notches are formed, the flange and the contiguous portion of the head together with the part of the cylindrical wall adjacent the head being so formed with said flange forming one of the raceways.

In testimony whereof, we have hereunto signed our names, at Syracuse, in the county of Onondaga, and State of New York, this 10th day of April, 1930.

CLARENCE A. SWART.
JOHN H. EVANS.